H. E. ELLIS.
APPARATUS AND PROCESS FOR PRODUCING PULP.
APPLICATION FILED FEB. 7, 1919.

1,344,625.

Patented June 29, 1920.
6 SHEETS—SHEET 1.

Inventor
Harry Ellwood Ellis,
By
Attorneys

H. E. ELLIS.
APPARATUS AND PROCESS FOR PRODUCING PULP.
APPLICATION FILED FEB. 7, 1919.

1,344,625.       Patented June 29, 1920.

H. E. ELLIS.
APPARATUS AND PROCESS FOR PRODUCING PULP.
APPLICATION FILED FEB. 7, 1919.

1,344,625.

Patented June 29, 1920.
6 SHEETS—SHEET 5.

Fig. 6.

Inventor
Harry Ellwood Ellis,

By D. Swift & Co.
Attorneys

H. E. ELLIS.
APPARATUS AND PROCESS FOR PRODUCING PULP.
APPLICATION FILED FEB. 7, 1919.

1,344,625.

Patented June 29, 1920.
6 SHEETS—SHEET 6.

UNITED STATES PATENT OFFICE.

HARRY ELLWOOD ELLIS, OF LEESBURG, FLORIDA.

APPARATUS AND PROCESS FOR PRODUCING PULP.

1,344,625. Specification of Letters Patent. Patented June 29, 1920.

Application filed February 7, 1919. Serial No. 275,661.

*To all whom it may concern:*

Be it known that I, HARRY ELLWOOD ELLIS, a citizen of the United States, residing at Leesburg, in the county of Lake, State of Florida, have invented a new and useful Apparatus and Process for Producing Pulp; and I do hereby declare the following to be a full, clear, and exact description of the invention, such as will enable others skilled in the art to which it appertains to make and use the same.

This invention relates to a process for producing pulp, and an apparatus for carrying out the process.

The invention aims to provide an apparatus for the manufacture of paper from materials that are not at present used, such materials as white mangrove, bamboo, bagasse, wild cane and like grass reeds or other productions, that grow in swampy lands of tropical and semi-tropical countries. Also various woods of the temperate zone may, by means of this process and apparatus, be made into pulp, provided the same is steamed under pressure.

The grinders heretofore employed in pulp plants, utilized wood blocks for coöperating against the face of a large grind stone, hydraulic or mechanical pressure being required to hold the blocks in coöperating with the stone.

It is the aim in the present process and apparatus to provide a machine for crushing and shredding the material to be used. Since the plants, such as heretofore named, are comparatively soft and pliable, and of slender growth, it has been found exceedingly practicable to crush and shred such material.

Further, the invention aims to shred the material the shredded material being then ground between the adjacent flat faces of basalt lava stones, of any suitable shape or form, preferably circular and of any suitable diameter, and it is the aim to provide these stones in groups of twos, the faces of the stones to be in parallel and the upper stone to be fixed while the lower stone is designed to run horizontally, whereby the shredded material is thoroughly ground. The material is fed between the stones with a sufficient quantity of water through an opening in the center of the upper stone, so that as material is ground, the pulp will be discharged by centrifugal force around the periphery of the stones. The pulp so produced, it has been found, is of an entirely different character from the pulp heretofore made, between the wood blocks and the grinding stone. It has been found that the pulp produced by the present process and apparatus has sufficient fiber for the manufacture of paper without the mixture of other fiber, whereas the pulp heretofore made, requires other fiber added.

Further, while the upper stone is stationary, it is the aim to render the lower stone revoluble, nevertheless the upper stone has the provision of means, whereby it is vertically adjustable, capable of being set in a fixed position with relation to the lower stone whereby sufficient clearance or space is allowed between the faces of the two stones, enabling the lower stone to revolve. By adjusting the upper stone, it is obvious that the shredded material may be ground coarse or fine, or medium, it depending upon the grade of pulp desired.

Pulp manufactured from some of the proposed materials, it has been found, can be bleached if required.

Owing to the character and construction of the present apparatus, and the process derived from the use of the same, it has been found that pulp can be manufactured from saw-mill refuse, such as lath edgings, slabs, etc., provided the wood is in pieces of small cross section, whereby it can be steamed under pressure within a reasonable time.

The pulp so produced from spruce, bass wood, poplar, etc., will have a reddish color and cannot be bleached, but it has been found that such pulp has sufficient fiber, enabling paper to be manufactured therefrom, without including any other fiber.

However, primarily, the object of the present invention is to utilize a large quantity of material heretofore gone to waste, for the manufacture of pulp.

The invention further aims to provide a multiple of machines or devices, so grouped and arranged in a frame, that the material, in being treated, may pass from one to the other, and after the material has finally completed its course through the apparatus, the pressing process being the final step, the material or pulp is then in condition to be employed for the manufacture of paper and the like.

The invention further provides unitary means for furnishing power to the multiple of machines or devices, whereby their operation are coördinately.

In practical fields the details of construction may necessitate alterations, falling within the scope of what is claimed.

The invention comprises further features and combination of parts, as hereinafter set forth, shown in the drawings and claimed.

In the drawings:—

Figure 1 is a view in side elevation of the improved apparatus for carrying out the process of the manufacture of pulp.

Figure 2:
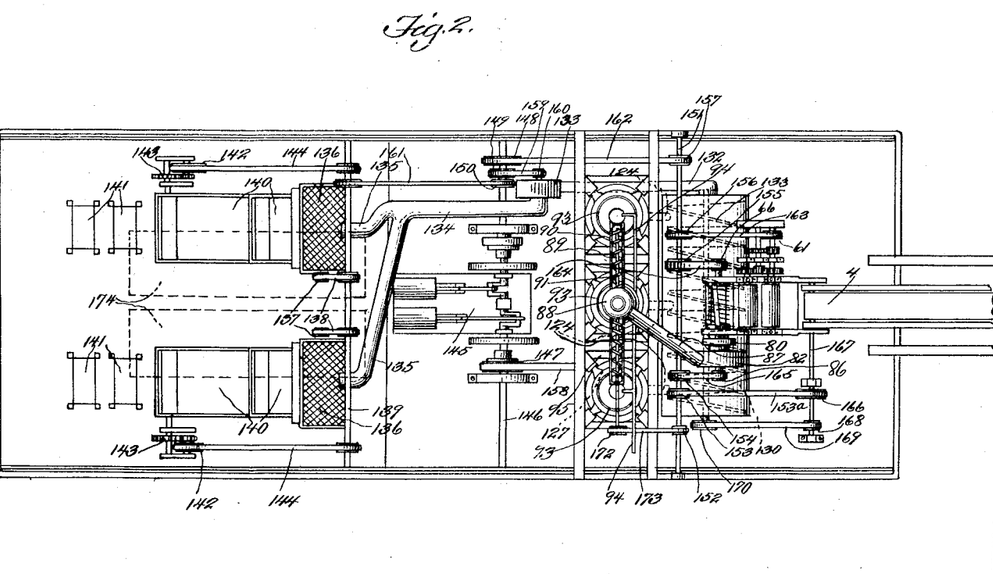
Fig. 2 is a plan view of the same.
Figure 3:
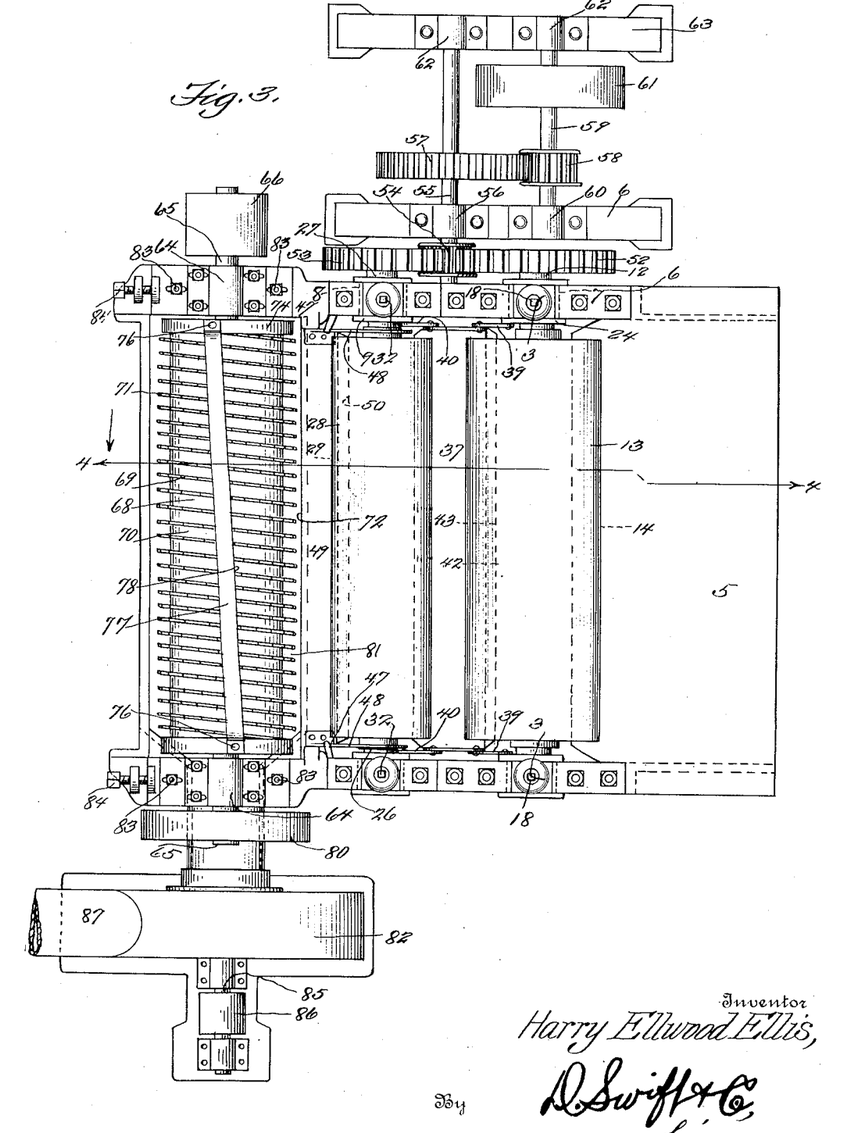
Fig. 3 is a plan view of the combined crusher and shredder.
Figure 4:
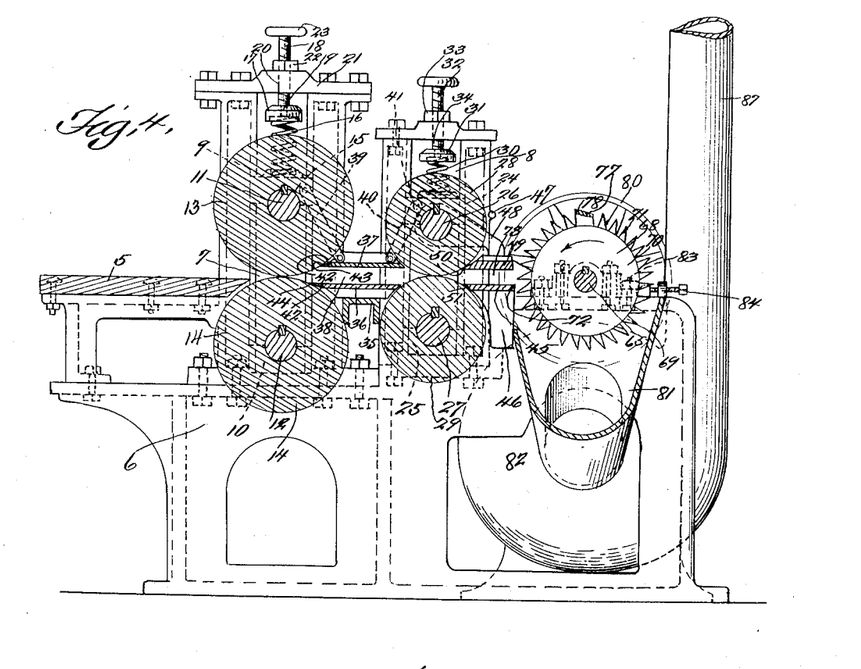
Fig. 4 is a vertical sectional view on line 4—4 of Fig. 3.
Figure 5:
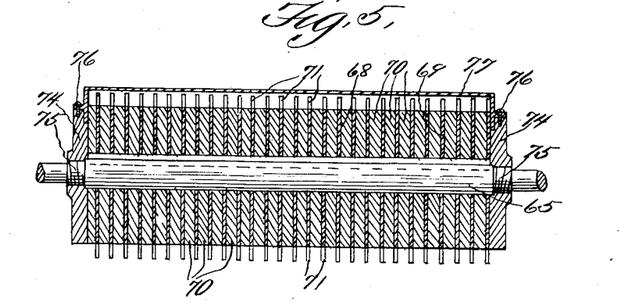
Fig. 5 is a longitudinal sectional view through the shredding roller of the shredder.
Figure 6:
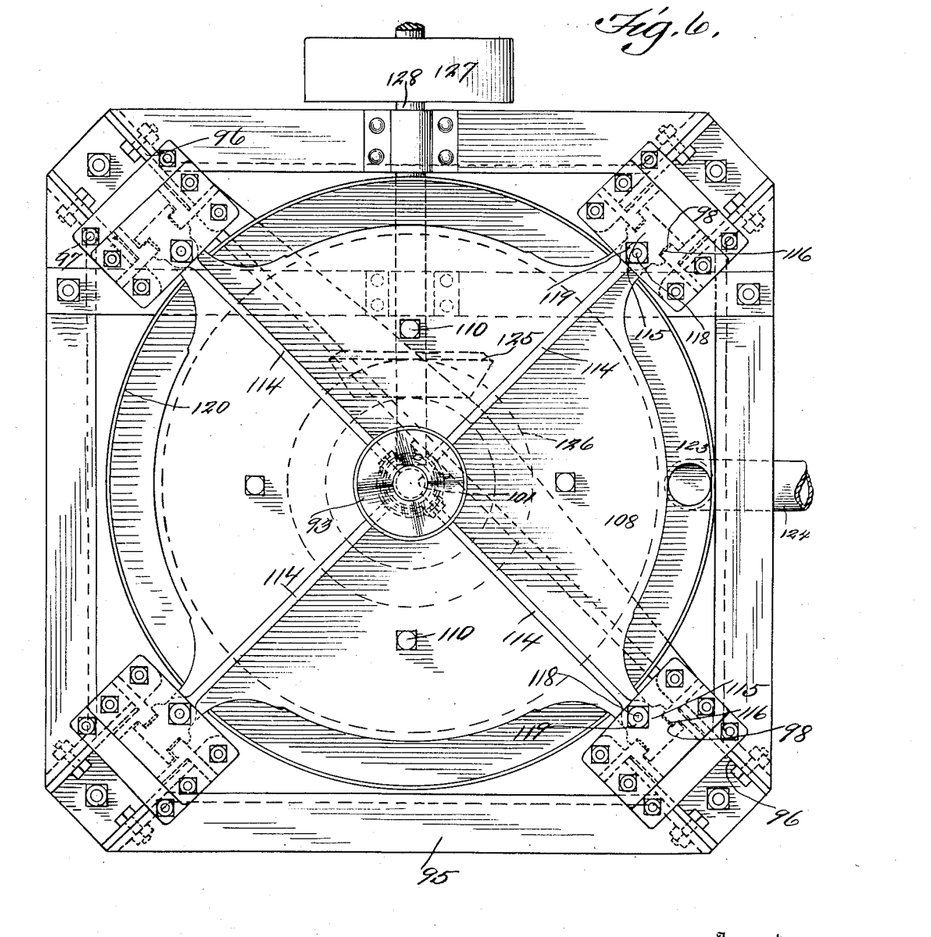
Fig. 6 is a plan view of the grinding machine for grinding the material, showing the separator in plan view.
Figures 7, 10, 11:
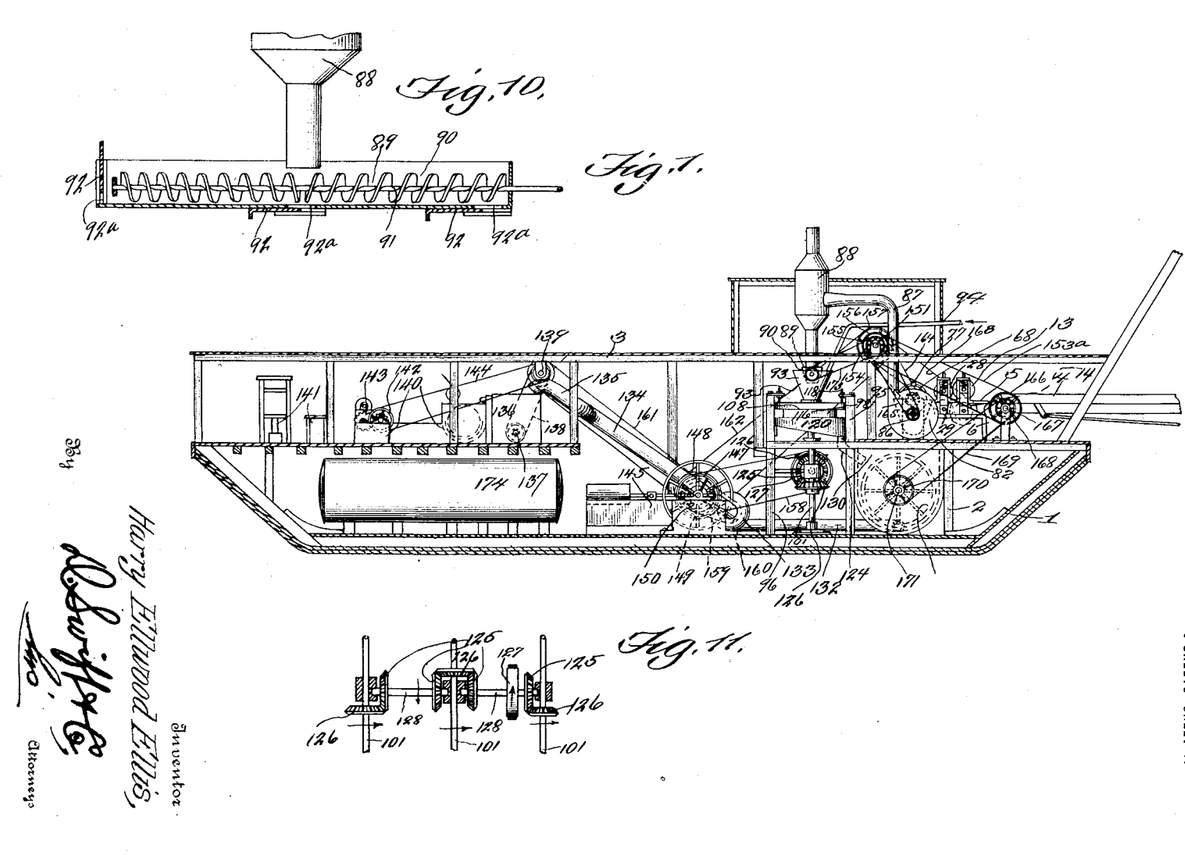
Fig. 7 is a vertical sectional view of the grinder, showing the greater part of the separator omitted.
Fig. 10 is a longitudinal sectional view through the screw propeller located beneath the separator.
Fig. 11 is a detail view of the gear drive mechanism for the mills.
Figure 7:
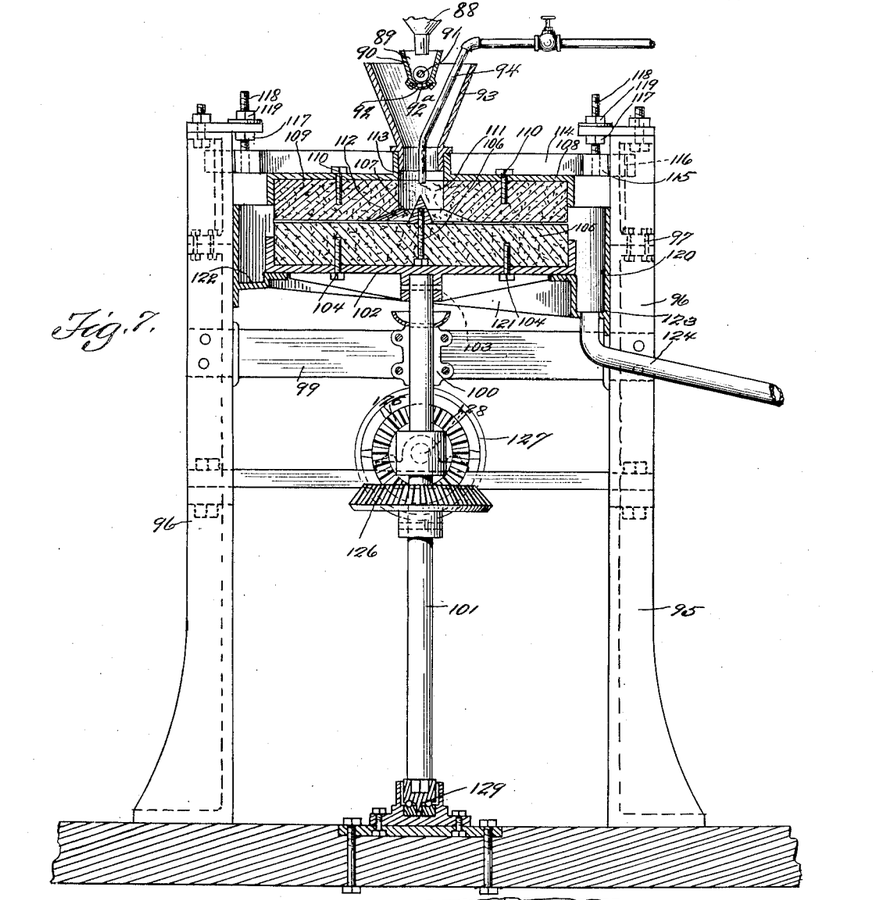
Figure 8:
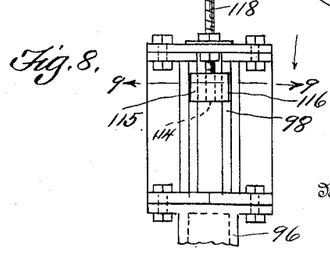
Fig. 8 is a detailed view of one of the guides for the upper stone of the grinder.
Figure 9:
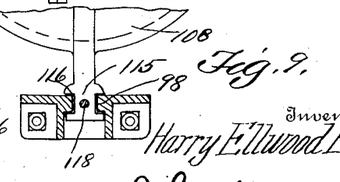
Fig. 9 is a sectional view on line 9—9 of Fig. 8.

Referring more especially to the drawings, particularly to Figs. 1 and 2, 1 designates a suitable frame, comprising a lower structure 2 and a super-structure 3, and 4 denotes a suitable conveyer for carrying the material, such as reeds or grasses gathered from swampy lands by means of a swamp harvester or the like, set forth in the copending application of H. E. Ellis, filed the 10th day of January, 1919, Serial Number 270,506, to the combined crusher and shredding mechanism. The material passes from the conveyer 4 on to the bed plate or table 5 of the combined crusher and shredder. This combined crusher and shredding mechanism consists of a frame 6 on which the bed plate or table 5 is mounted. This frame is provided with pairs of opposite guides 7 and 8, which are upright. Mounted in the guides 7 are the upper and lower bearing blocks 9 and 10, the blocks 9 being superimposed. The shafts 11 and 12 on which the upper and lower crushing rolls 13 and 14 are keyed, have their ends engaging the semi-circular bearings 15 of said blocks, the upper blocks acting as followers. The material passes between and is crushed by the upper and lower rollers 13 and 14, there being springs 16 bearing with sufficient pressure upon the upper blocks (which are dovetailed in the guides) in order to provide sufficient pressure for the upper roll. The lower bearing blocks are also dovetailed in the guides. The springs 16 are engaged on their upper ends by the followers 17, to which the screws 18 are swivelly connected as at 19. These screws are threaded at 20 into the heads 21 of the guides, and by loosening the lock nuts 22, the screws may be adjusted by grasping the hand wheels 23, for increasing or decreasing the tension of the springs. Mounted in the guides 8 are bearing blocks 24 and 25 the latter being superimposed with relation to the former, both being similar to the bearing blocks 9 and 10. Upper and lower shafts 26 and 27 have their ends mounted in bearings of the blocks 24 and 25. Auxiliary crushing rolls 28 and 29 are keyed to the shafts 26 and 27, and between which the material passes, after passing from between the rolls 13 and 14. The upper bearing blocks 24 as well as the bearing blocks 25 are dovetailed in their guides. Suitable springs 30 engage the bearing blocks 24, there being followers 31 engaging the upper ends of the springs. By adjusting the screws 32, subsequently to having loosened the nuts 33, the tension of the springs 30 may be increased or decreased, as may be required, whereby the upper roll 28 may coöperate with sufficient pressure with the lower roll for crushing material. The screws 32 are swiveled at 34 in the followers 31. Mounted upon a support 35 which is secured in any suitable manner between the sets of guides is a scraper plate 36, which is sometimes termed "as a doctor." A second scraper plate or doctor 37 is superimposed with relation to the scraper or doctor 36 and spaced therefrom, thereby providing a throat 38 through which the material may pass, when passing from the main crushing rolls to and between the auxiliary crushing rolls. This second scraper plate or doctor has pivotally connected thereto the links 39 and 40, which are in turn pivoted at 41 to the upper bearing blocks 9 and 24. It is apparent that as the upper crushing rolls 13 and 28 yield incident to the material passing therebetween, the upper scraper plate or doctor will move therewith. These scraping plates or doctors 36 and 37 have their corresponding portions 42 provided with sharp steel edges 43 and 44, which coöperate with the circumferences or peripheral surfaces of the upper and lower rolls 13 and 14, for scraping the material from the rolls, thereby preventing the same from moving around with the rolls and keeping the faces of the rolls clear for additional material. A scraper plate or doctor 45 has its depending parts 46 secured in any suitable manner to the sides of the frame 6, adjacent the lower roll 29. Pivotally suspended on the ends of the shaft 26 for limited play through the medium of the lug 47 are the arms 48, to which is connected a scraper plate or doctor 49, which is superimposed with relation to the scraper plate 45. It is obvious that the scraping plate 49 will move with the upper roll 28, as it raises and lowers incident to the material passing between the rolls 28 and 29. These scraping plates or doctors 45 and 49 also have sharp steel cutting edges 50 and 51, for coöperating with the peripheral faces of said upper and lower rolls 28 and 29, for scraping the material therefrom, and preventing the same from adhering to the surfaces of the rolls. The corresponding ends of the lower shafts 12 and 27 are provided with gears 52 and 53, which are in mesh with a pinion 54 of a countershaft 55, which is mounted in a bearing 56 of one end of the frame 6. This shaft 55 has a gear 57 meshing with a pinion 58 on a countershaft 59, which is also mounted in a bearing 60 of the frame. A pulley 61 is carried by the shaft 59, and this shaft and the shaft 55 is mounted in additional bearings 62 of the standard 63. By means of power being transmitted as will be hereinafter set forth to the pulley 61, motion will be imparted to the lower rolls 14 and 29. The series of crushing rolls are designed to have smooth faces and are to be constructed of any suitable material, preferably chilled cast iron. Also mounted in bearings 64, which are adjustable as will be hereinafter set forth, is a shaft 65 provided with a pulley 66 at one end. Keyed upon the shaft 65 is a shredding roll 68. This shredding roll comprises a series of circular saw blades arranged at spaced intervals, and interposed between said saw blades 69 are circular wood or other fiber fillers 70, which are of such diameters as to leave the teeth of the saw blades projecting beyond. These teeth 71 may be of any desired pitch, preferably as shown, and are designed to coöperate with the edge portion 72 of the scraper plate or doctor, for shredding the material as it leaves the passage 73 formed by the scraping plates or doctors 45 and 49. The saw teeth are constructed of tempered steel preferably of a coarse pitch, and are beveled to a sharp edge. These circular saw blades and their intermediate fillers of wood are clamped and held in place on the shaft 65 by means of circular cast iron heads 74, which are threaded by right and left threads 75 on the shaft 65. Bolted or otherwise secured at 76 on the head plates is a cutter bar 77, which arches the saw teeth. This cutter bar is arranged slightly tangential with relation to the teeth, and is provided with a sharp cutting edge 78, for coöperation with the cutting edge 72 (which is ground to a bevel) for cutting the material as it leaves the passage or space 73. This cutter bar is constructed of tempered steel, and owing to its angle with relation to the shredding roller, that is to the axial bearing of the shredding roller, as shown in Fig. 3, the cutting bar makes a shearing cut against the cutting edge 72 of the scraper, doctor or bed plate 45. On an inspection of the drawings it will be seen that the saw blades are arranged at angles to the axial line of the shredding roller shaft, as shown in Fig. 3, thereby providing an eccentric cut or shredding action on the material as it leaves the passage 73. The opposite end of the shredding roller shaft has a pulley 80, and it is obvious that belting may be connected either to this pulley 80 or to pulley 66. If to the latter the shredding roller may be operated at a greater rate of speed and if to the former the speed may be decreased. The material after being cut and shredded by the roller empties into the hopper 81, which is in communication with the exhaust fan 82. The bearings of the shaft 65 of the shredding roller are connected by slot and bolt connections 83 to the frame 6, and by means of the screws 84 which are swiveled to said bearings, the bearings may be adjusted, whereby the shredding roller may be adjusted toward and from the cutting edge of the bed plate 45. The shaft 85 of the fan is provided with a pulley 86, to which power may be transmitted as will be hereinafter set forth, for operating the fan, for creating a suction, for drawing the material into the fan casing and forcing the same through the conduit 87, through the conduit, and into a conventional form of separator 88, which will discharge the material into a conventional form of screw conveyer 89. As shown in Fig. 10 this screw conveyer comprises a casing 90 and the screw 91, and is provided with outlets so controlled by the gates 92 whereby the material may empty substantially equally into the series of hoppers 93, there being a water conduit 94 for carrying water to the various hoppers for mixing with and sluicing the material. These hoppers carry the material respectively to the various grinding devices, which are disposed below the hopper. These grinding devices are similar in construction, therefore in the present application only one is described. For instance each grinding device comprises a frame 95, of any suitable construction, preferably as shown. Mounted upon the standards 96 of the frame 95, and bolted thereto as at 97, are the guide brackets 98. These corner standards are reinforced by the cross connecting braces 99, the inner ends of which connect to a bearing member 100, in which a vertical shaft 101 is mounted. A circular casing 102 is pinned or keyed to the upper ends of the vertical shaft 101, and secured in this casing by means of bolts 104 is the lower basalt lava grinding stone 105, which is circular and may be any suitable diameter or thickness. Passing through the center of the stone 105 is a bolt 106, to the upper end of which a cone shaped divider 107 is threaded. A second casing 108 is inverted and superimposed with relation to the casing 102. An upper grinding stone 109 is secured in the second casing 108 by the bolts 110. The upper stone, which is non-revoluble is of the same material as the lower stone. The adjacent faces of the stones are designed to be at all times in true parallelism. The center of the stone 109 is provided with a concentric opening 111, which spreads or flares outwardly as shown at 112 at its lower end, so as to permit the material as it is divided by the divider 107 to be forced outwardly between the adjacent faces, that is fed outwardly, by centrifugal force. The casing 108 has a concentric flanged opening 113 registering with the opening 111, and into which flanged opening the lower contracted end of the hopper 93 extends, so as to carry the material as it is sluiced through the superimposed or upper stone 109. The upper casing 108 is provided with a series of radiating strengthening ribs 114, which terminate in enlarged arms 115, which are dovetailed as at 116 in the guides 98, which are bolted upon the corner standards. By loosening the lower lock nuts 117 of the screws 118, which are carried by the arms 115, and by adjusting the upper nuts 119 of the screws, the screws are raised and lowered, resulting in adjusting the superimposed casing 108, whereby the space between the adjacent faces of the grinding stones may be regulated, that is increased or decreased, for grading the material, making the same either fine or coarse. Surrounding the periphery of the lower stone and part of the upper stone is a trough circular casing 120, the bottom of which as indicated at 121 is inclined from the point as indicated at 122 toward and around opposite sides to a diametrically opposite point 123, whereby the material as it leaves the space between the two stones by the centrifugal force, will flow toward and to the outlet conduit 124, which is connected to the bottom of the trough casing. As before stated the grinding devices are in multiples, and their vertical shafts 101 are intergeared by the beveled gears 125 and 126, there being a pulley 127 on one of the shafts 128 which carry two of the gears 125. The lower end of each of the shafts 101 is mounted in a thrust bearing 129. The material after being ground empties from the conduit 124 into the stuff chest 130, where it by means of the screw is packed and forced and agitated preparatory to being withdrawn. As the material is agitated by the spiral agitator 131 it is drawn into the conduit or pipe 132 by the stuff pump 133, which in turn forces the material through the conduit 134, and out through the branches 135 into the screening members or machines 136. The operating shafts 137 of the screening machines are belted as at 138 to the counter-shaft 139. The material is then transferred to the wet machines 140, and thence to the pulp pressers 141 by any suitable means not shown. The pulleys 142 of the operating gearing 143 of the wet machines are belted by means of the belt 144 to the counter shaft 139. A conventional form of gas engine 145 is mounted upon the lower structure of the frame, and its crank drive shaft 146 is provided with a plurality of pulleys 147, 148, 149, and 150. Mounted in bearings of the superstructure of the frame is a counter shaft 151, which is provided with a series of pulleys 152, 153, 154, 155, 156 and 157. The pulley 147 is belted by means of the belt 158 to the pulley 127 of one of the shafts 128, for driving the grinding mechanism. The pulley 149 by means of the belt 159 is geared to the pulley 160 of the stuff pump 133. By means of the belt 161, the pulley 150 is geared to the counter shaft 139, which in turn operates the screen machine. The pulley 148 through the medium of the belt 162 engaging the pulley 157 furnishes power to the counter shaft 151. The pulley 61 of the shaft 59 of the crushing machine is coupled to the pulley 156 by the belt 163. The pulley 155 of the counter-shaft 151 is coupled to the pulley 66 of the shredding roller by means of the belt 164. This belt may be disconnected from 66, and the pulley 55 adjusted on the shaft 151 opposite the pulley 80 of the shredding roller and another belt (not shown) employed, so as to decrease the speed of the shredding roller. By this gearing power is transmitted to the combined crusher and shredding machine. By means of the belt 165, the pulley 154 is coupled to the pulley 86 of the suction fan 82, and pulley 153 is coupled by means of the belt 153$^a$ to a pulley 166 of the shaft 167 of the conveyer 4, for furnishing power to the conveyer. A pulley 168 is mounted upon the shaft 167 and is coupled by means of the belt 169 to a pulley 170 of the shaft 171 of the spiral agitator, so that power is transmitted to the agitator. In order to operate the screw conveyer shaft of the series of hoppers, said shaft has a pulley 172, which is connected by means of the belt 173 to the pulley 152 of the countershaft 151. In order to make the plant or apparatus complete oil tanks 174 are mounted on the lower structure of the frame to hold fuel for the engine. It is to be noted that the various machines are operated by belt or chain drive from the internal combustion engine. The reeds or grass are fed between the crushing rolls 13 and 14, the stems thereof being flattened and the whole mass forwarded to and between and compressed further by the rolls 28 and 29, the stuff being prevented from sticking to the rolls or curling upwardly or downwardly by the doctors or scrapers 36 and 37 and 45 and 49. The fibrous material is then shredded by the shredding roller, then conveyed by the exhaust fan to the separator 88, then to the screw conveyer and thence into the multiple of hoppers where it is sluiced. The material in passing over the bed plate or scraper 45 is held in a flat thin mass and held down on the bed plate by the doctor or scraper 49, and close up to the point of contact with the teeth of the shredding roller. Owing to the saw blades of the shredding roller being set at an angle with the line of the shaft, the teeth as they follow each other come in contact with the edge of the mat of stuff projecting over the edge of the bed plate 45. This point of contact of the succeeding teeth is out of alinement with each other, the effect being to split the mat of stuff as it thrusts forward into finely divided filaments which are cut off at each revolution of the cutter bar 77. This coarse fibrous material is cut into one inch lengths. As before stated the exhaust fan continuously draws the material by suction and forces it into the separator. The material as it is sluiced in the series of hoppers is then thoroughly ground, the upper stone being adjusted or regulated according to the quality of pulp required, the greater the flow of the sluicing water will provide a coarser pulp. The material is then transmitted to the agitator, then by means of the stuff pump 133 to the screening machines, and thence to the wet machines, and its final step to the presses 141, after which the material is ready for the manufacture of paper. This apparatus and process for producing pulp, from which paper and the like may be manufactured, is an improvement on the process and apparatus set forth, illustrated and claimed in the patent to Harry Ellwood Ellis, issued August 7, 1917, Patent No. 1,236,072.

The invention having been set forth, what is claimed as new and useful is:—

1. In a machine for the manufacture of pulp, the combination with a frame, of a grinding mechanism on the frame, a combined crushing and shredding mechanism on the frame for crushing and shredding the raw green material, a separating device for the material, means for transferring material from the crusher and shredder to the separator, conveying means for introducing the material into the grinding mechanism, and unitary operating means having connections with the grinder and the combined crusher and shredder, whereby said mechanisms may be operated, a combined compressor and agitator for the fiber, having connections with the unitary operating means, means for conveying the fiber into said combined compressor and agitating device, screening means operated by the unitary operating means, a connection between the combined compressor and agitator and the screening means, and wet machines connected to and operated by the unitary operating means and adapted to receive the fiber from the screening means, and means for pressing the fiber.

2. In a machine for the manufacture of pulp, the combination with a frame consisting of an under structure and a superstructure, of crushing means on the superstructure, a shredder on the superstructure, means whereby the crushed material will be transferred to the shredder, a separator located above and to the rear of the shredder, means for conveying the shredded material from the shredder to the separator, a sluicing device located below the separator and into which sluicing device the separator discharges, said sluicing device being located above a grinder, means whereby the ground material from the grinder will be discharged from the grinder and unitary means for operating the above mechanisms.

3. In a machine for the manufacture of pulp, the combination with a frame consisting of an under structure and a superstructure, of crushing means on the superstructure, a shredder adjacent said crushing means, means whereby the crushed material will be transferred to the shredder, a separator located above and to the rear of the shredder, means for conveying the shredded material from the shredder to the separator, a sluicing device located below the separator and into which sluicing device the separator discharges, grinders located below the sluicing device and transversely disposed, means whereby the material from the sluicing device will be discharged into the grinders, means whereby the ground material from the grinders will be discharged from the same and unitary means for operating the foregoing mechanisms.

4. In a machine for the manufacture of pulp, the combination with a frame consisting of an understructure and a superstructure, of crushing means located on the superstructure, a shredder adjacent said crushing means, means whereby the crushed material will be transferred from the crusher to the shredder, a separator located above and to the rear of the shredder, means for conveying the shredded material from the shredder to the separator, a transversely disposed sluicing device located below the separator and into which sluicing device the separator discharges, grinders located below the sluicing device, a single discharge from said grinders and unitary means for operating the foregoing mechanisms.

5. In a machine for the manufacture of pulp, the combination with a frame consisting of an under structure and a superstructure, of crushing means located on the superstructure, a shredder on the superstructure, means whereby the crushed material will be transferred to the shredder, a separator located above and to the rear of the shredder, means for conveying the shredded material from the shredder to the separator, a sluicing device located below the separator and into which sluicing device the separator discharges, said sluicing device being located above a grinder, a combined agitator and compressor into which the ground material passes, a discharge for said agitator and compressor and unitary means for operating the above mechanisms.

6. In a machine for the manufacture of pulp, the combination with a frame consisting of an under structure and a superstructure, of crushing means located on the superstructure, a shredder on the superstructure, means whereby the crushed material will be transferred to the shredder, a separator located above and to the rear of the shredder, means for conveying the shredded material from the shredder to the separator, a sluicing device located below the separator and into which sluicing device the separator discharges, said sluicing device being located above a grinder, a combined agitator and compressor located below the grinder and into which compressor the ground material passes by gravity, a screening device located on the superstructure, means whereby the pulp will be conveyed from the combined agitator and compressor to the screening device and unitary means for operating the above mechanisms.

7. In a machine for the manufacture of pulp, the combination with a frame consisting of an under structure and a superstructure, of crushing means located on the superstructure, a shredder on the superstructure, means whereby the crushed material will be transferred to the shredder, a separator located above and to the rear of the shredder, means for conveying the shredded material from the shredder to the separator, a sluicing device located below the separator and into which sluicing device the separator discharges, said sluicing device being located above a grinder, a combined agitator and compressor located below the grinder and into which compressor and agitator the ground material passes by gravity, a screening device located on the superstructure, means whereby the material from the agitator and compressor will be conveyed and discharged into the screening device, a wet machine located on the superstructure and into which the screened material passes from the screening machine, and unitary means for operating the foregoing mechanisms.

8. The process of making pulp from fibrous materials consisting of first crushing the material, then shredding the same, then passing the same to a separator for separating the foreign matter therefrom, then sluicing the material, then grinding the material, then simultaneously agitating and compressing the same, after the matter has been simultaneously agitated and compressed screening the same, then wetting the same and finally pressing the material.

In testimony whereof I have signed my name to this specification in the presence of two subscribing witnesses.

HARRY ELLWOOD ELLIS.

Witnesses:
R. F. F. Cook,
D. Lewis Baker.